United States Patent [19]

Ogawa

[11] Patent Number: 5,136,327
[45] Date of Patent: Aug. 4, 1992

[54] POWER CONTROL CIRCUIT FOR CAMERAS

[75] Inventor: Hidehiro Ogawa, Funabashi, Japan

[73] Assignee: Nikon Corporation, Tokyo, Japan

[21] Appl. No.: 659,887

[22] Filed: Feb. 25, 1991

[30] Foreign Application Priority Data

Feb. 26, 1990 [JP] Japan .................. 2-18636[U]

[51] Int. Cl.⁵ ............................... G03B 7/26
[52] U.S. Cl. .................................... 354/484
[58] Field of Search ........................... 354/484

[56] References Cited

U.S. PATENT DOCUMENTS

| | | | |
|---|---|---|---|
| 4,387,977 | 6/1983 | Uchidoi et al. | 354/484 |
| 4,429,974 | 2/1984 | Suzuki | 354/484 |
| 4,553,140 | 11/1985 | Maida | 354/484 X |
| 4,645,326 | 2/1987 | Kiuchi et al. | 354/484 |
| 4,733,265 | 3/1988 | Haraguchi et al. | 354/484 |
| 4,872,069 | 10/1989 | Takami et al. | 354/484 |
| 4,914,469 | 4/1990 | Ishimura et al. | 354/484 |
| 4,916,474 | 4/1990 | Miyazawa et al. | 354/484 X |
| 5,032,864 | 7/1991 | Ishimura et al. | 354/484 |
| 5,079,585 | 1/1992 | Yamada | 354/484 |
| 5,081,483 | 1/1992 | Ishimura et al. | 354/484 |

Primary Examiner—W. B. Perkey
Attorney, Agent, or Firm—Shapiro and Shapiro

[57] ABSTRACT

A power supply unit for cameras, wherein if no operation is performed for a certain time with a power switch ON, power is supplied only to a display unit and the power supply to other circuits is automatically turned OFF. In this state, when a release switch, for instance, is operated, power is supplied to all circuits. When the power switch is turned OFF, display data is stored and the power supply to all circuits including a liquid crystal display unit is turned OFF. When the power switch is turned ON, the display data contained is transferred to the liquid crystal display unit for display. This prevents unnecessary power consumption.

6 Claims, 7 Drawing Sheets

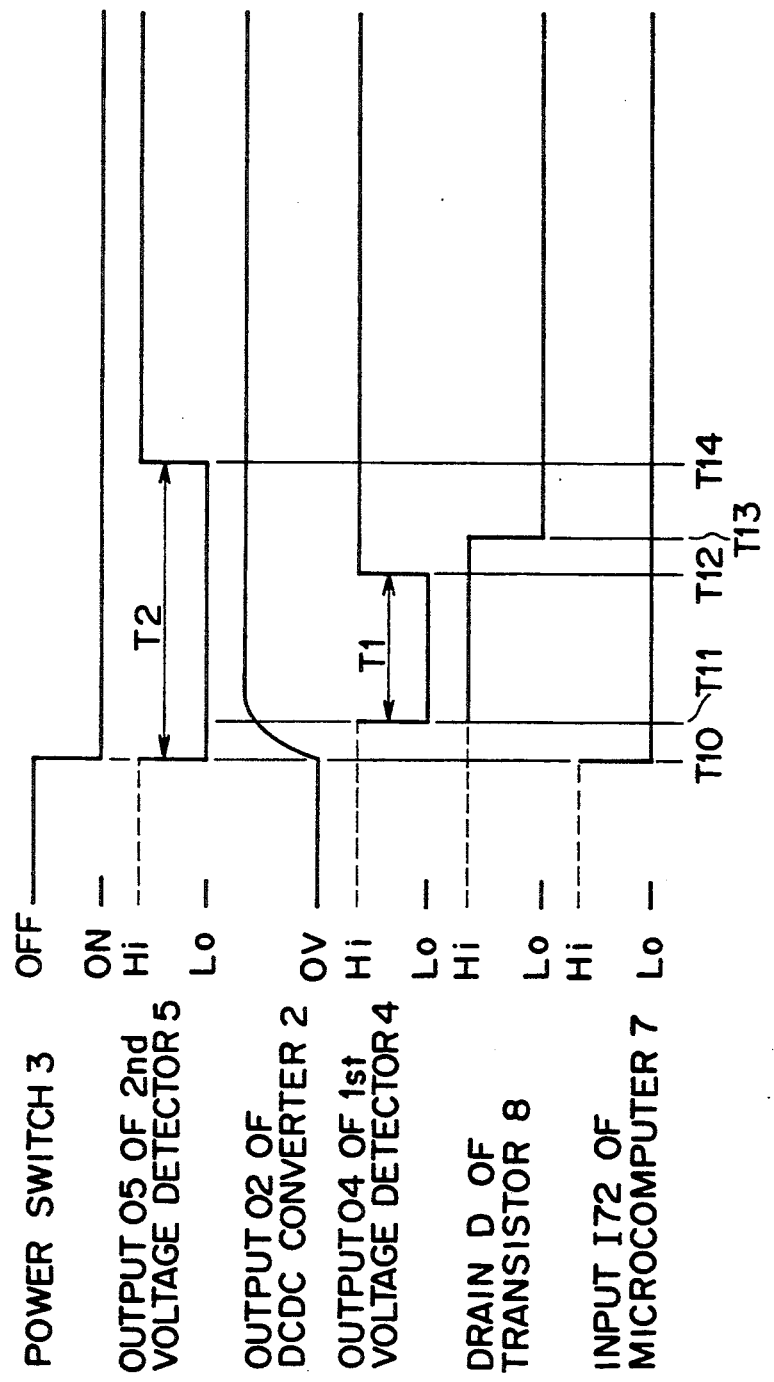

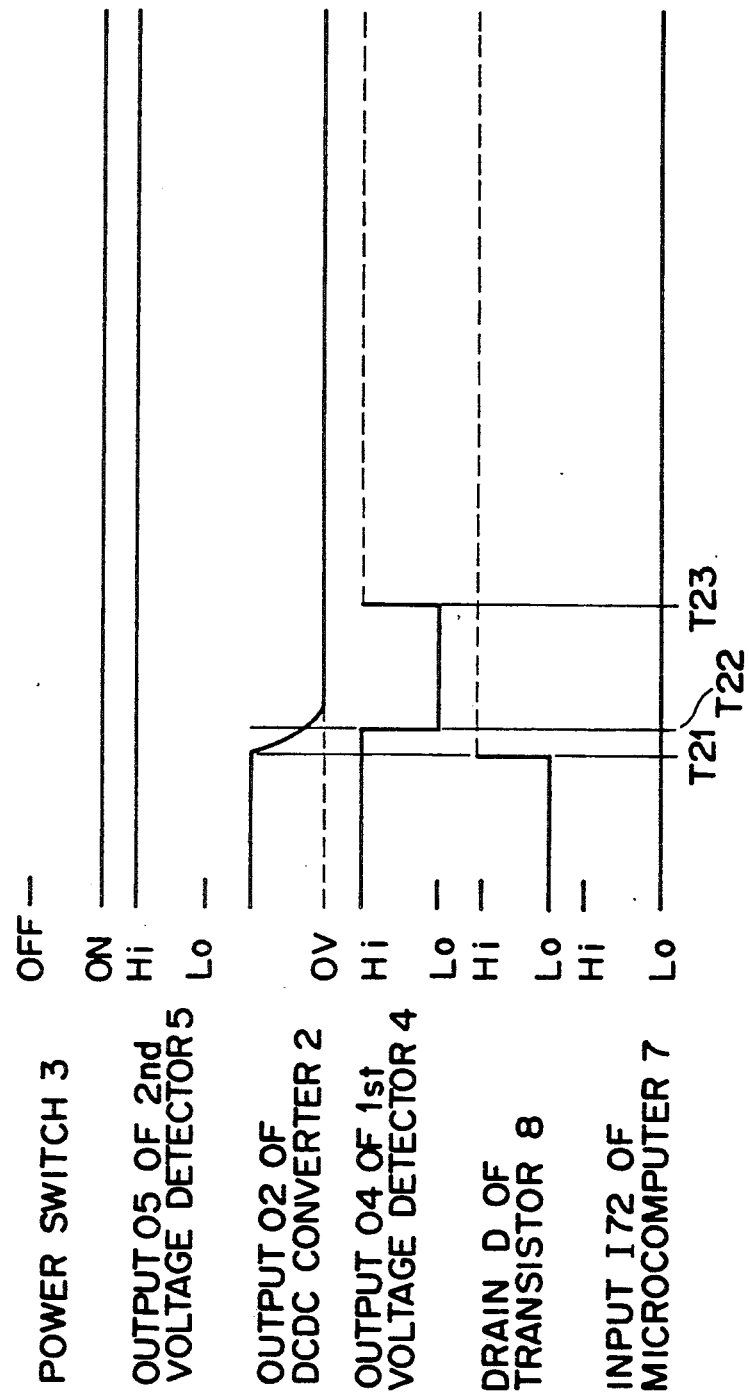

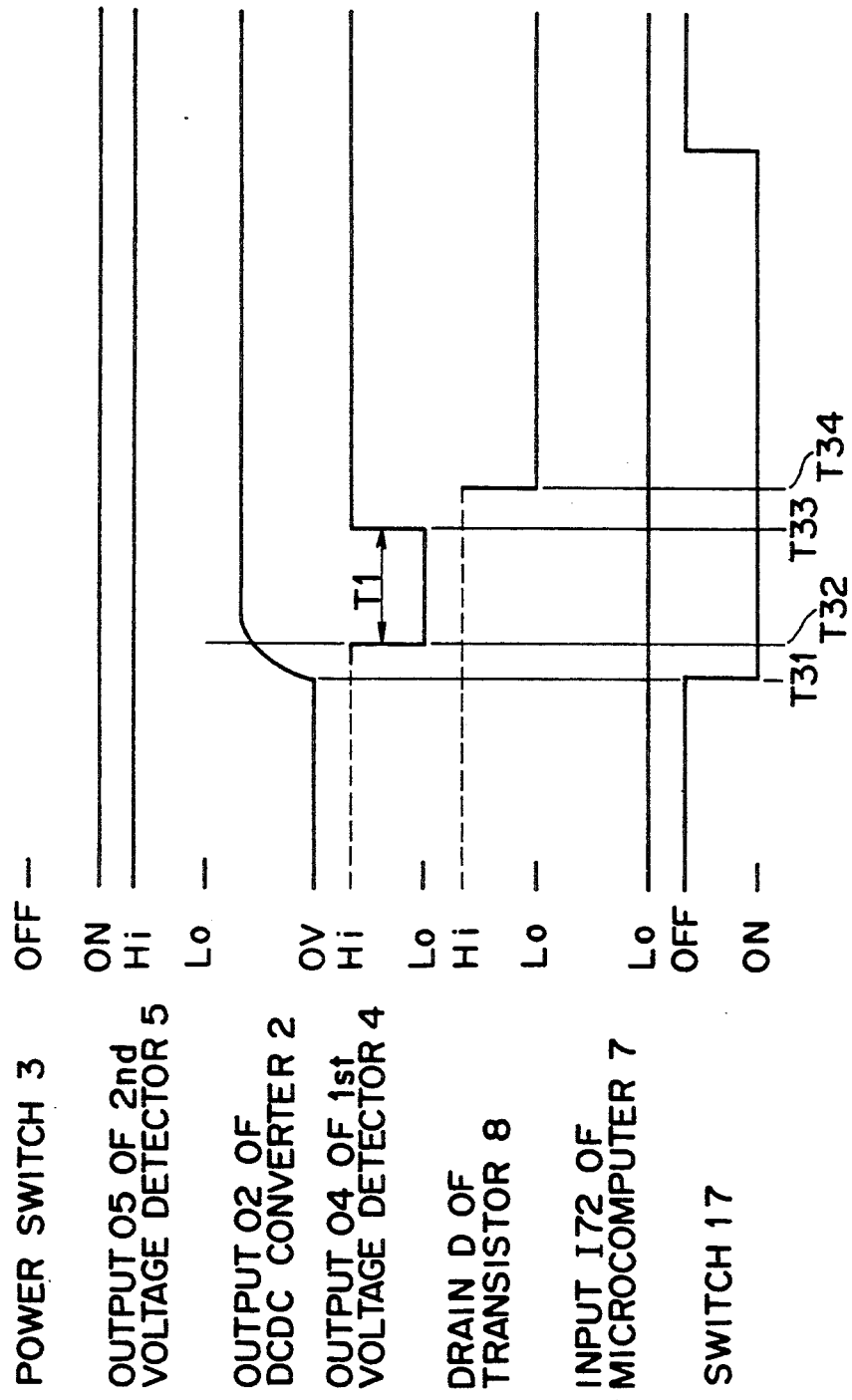

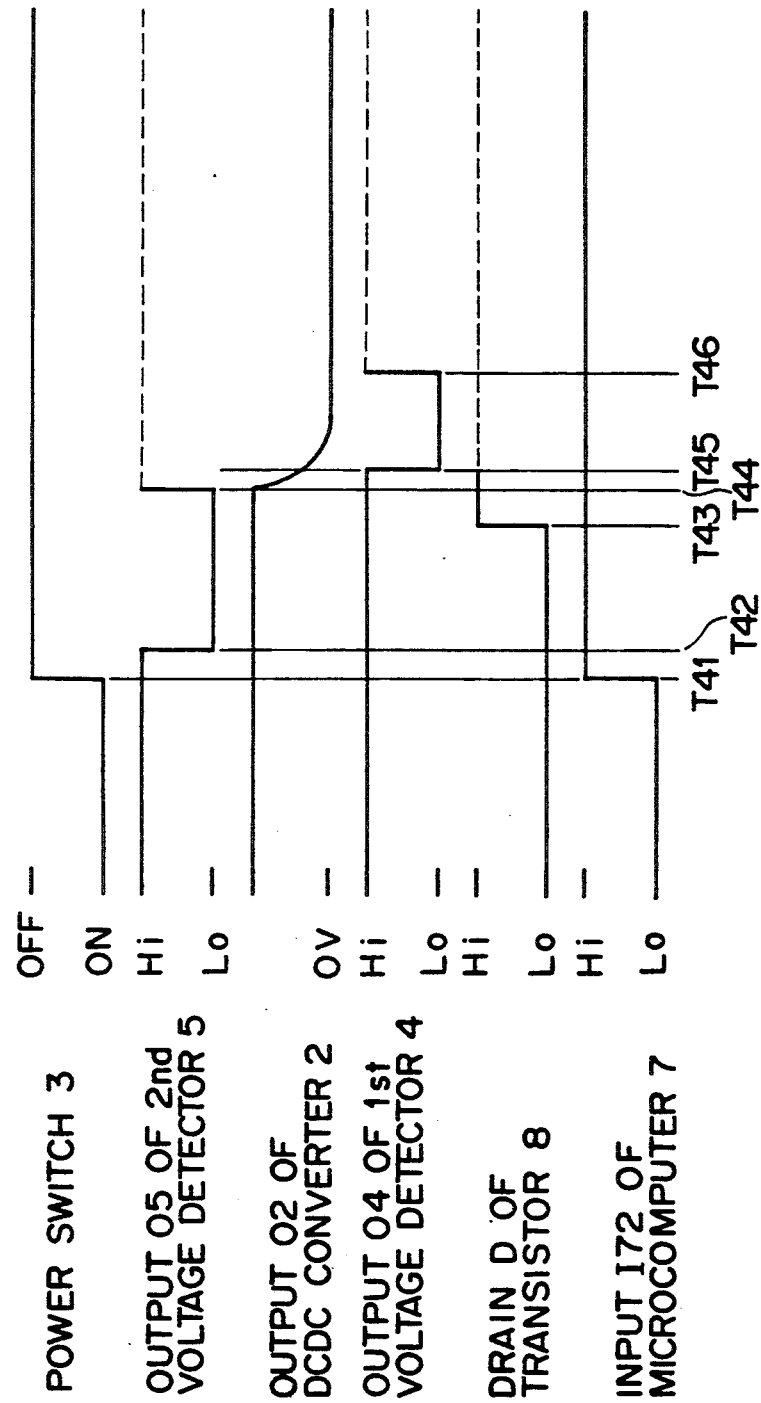

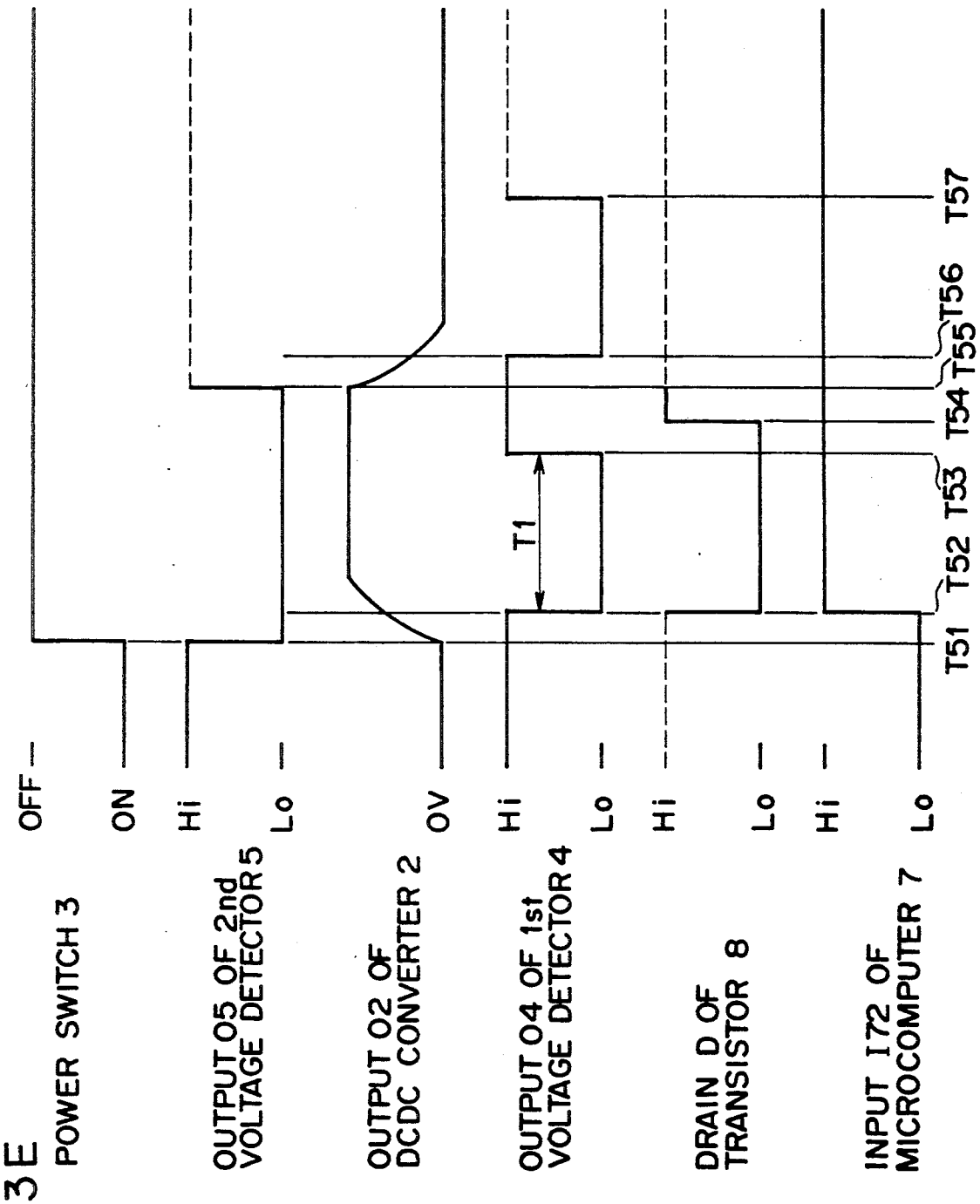

POWER CONTROL CIRCUIT FOR CAMERAS

BACKGROUND OF THE INVENTION

1. Field of the Invention

The present invention relates to a power control circuit for cameras.

2. Related Background Art

A known power control circuit for cameras automatically turns OFF power supply if no operation is performed for a certain time period with the power switch ON (this function is, hereafter, called a Timer OFF function). Using a camera incorporating this power control circuit, even if the switch is held ON, battery consumption is prevented. In this kind of a prior camera, even when the power supply is turned OFF by the Timer OFF function, power is supplied to at least a liquid crystal driver IC or a microcomputer having a liquid crystal function so that the number of frames of film can be displayed uninterruptedly. Moreover, when the power switch is turned OFF, a liquid display disappears. When the power switch is turned ON afterward, the previous display must be reproduced. Therefore, power is supplied to the liquid crystal driver IC or the microcomputer having the liquid crystal function even after the power switch is turned OFF. Thus, the display data is stored.

As mentioned above, in the prior camera, even when the timer or the power switch is turned OFF, power is supplied to the liquid crystal driver IC or the microcomputer having the liquid crystal function. It is impossible to prevent completely battery consumption.

SUMMARY OF THE INVENTION

The object of the invention is to provide a power control circuit for cameras which stops the power supply to a microcomputer when either the timer or the power switch is turned OFF without degrading the conventional functions.

BRIEF DESCRIPTION OF THE DRAWINGS

FIGS. 3A to 3E are timing charts showing the operations of the main components. FIG. 3A shows a state that the power switch is ON. FIG. 3B shows a state that the power supply is automatically turned OFF because no operation is done for a certain time with the power switch ON. FIG. 3C shows a state that an operation is restarted from the state of FIG. 3A and the power supply is automatically turned ON. FIG. 3D shows a state that the power switch is turned OFF. FIG. 3E shows a state that no operation is done for a certain time with the power switch ON, and the power supply is automatically turned OFF, then the power switch is turned OFF.

An embodiment of the invention is described below in conjunction with the drawings.

Figure 1:
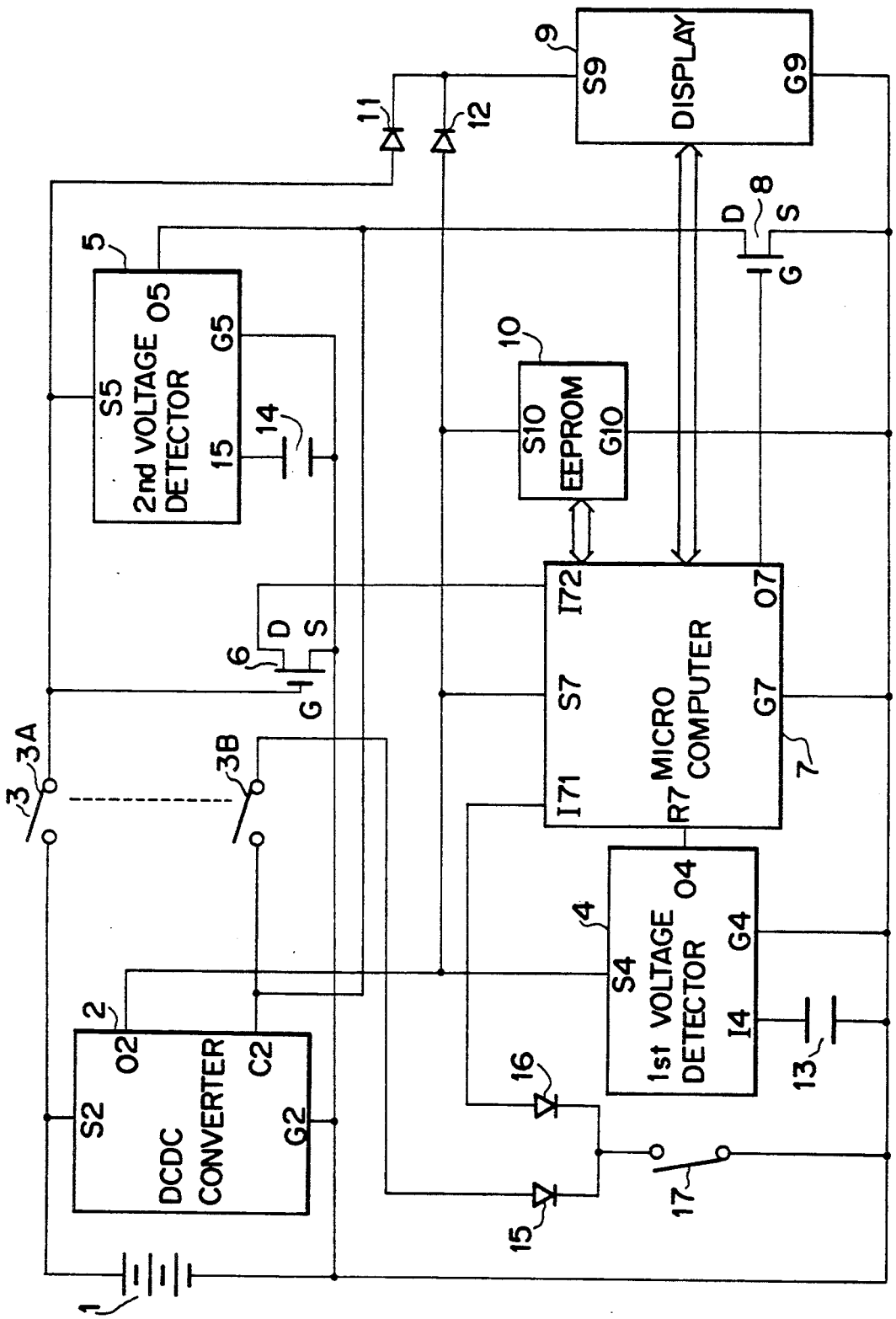
FIG. 1 is a circuit diagram showing an embodiment of a power control circuit for cameras of the invention.

FIG. 1 is a circuit diagram showing an embodiment of the invention.

In the drawings, reference numeral 1 represents batteries to be connected to DCDC converter 2. The DCDC converter 2 boosts voltage of the batteries 1 to supply stable power to circuits. When a low-level signal is applied to the control terminal C2, the DCDC converter 2 is activated to output voltage to a terminal 02. When a high-level signal is applied to the control terminal C2, the DCDC converter 2 stops and the voltage at the terminal 02 disappears. 3 is a power switch, having a contact 3A for turning ON the main power supply and a contact 3B for controlling the control terminal C2 which are interlocked with the contact 3A to open and close circuits.

4 is a first voltage detector circuit, wherein an output terminal 04 is low until the voltage of a voltage detecting terminal S4 connected to the DCDC converter 2 exceeds a given value, and it is driven high after a certain time T1 has elapsed. The certain time T1 is set by a capacitor 13. 5 is a second voltage detector circuit, wherein an output terminal 05 is low until the voltage of a voltage detecting terminal S4 connected to the power switch 3A exceeds a given value, and it is driven high when a certain time T2 has elapsed. The certain time T2 is set by a capacitor 14. A delay time T2 for the voltage detector circuit 5 is set longer than a delay time T1 for the voltage detector circuit 4. 6 is a transistor. The transistor 6 is set to ON/OFF according to the power ON/OFF state and transmits a signal to a microcomputer 7 which will be described later, when its gate is connected to the power switch 3A.

The microcomputer 7 consists of a read only memory (ROM) which contains programs to be mentioned later and other peripheral devices (not illustrated), and transfers various data items with a liquid crystal display unit 9 and an EEPROM 10 to be mentioned later via a data bus. An input terminal I72 is provided with a signal indicating an ON or OFF state of the power switch 3 when connected to the transistor 7. When the input signal is driven high, the microcomputer 7 transmits various data items to the EEPROM 10. When the terminal I72 is driven low, the microcomputer 7 receives various data items from the EEPROM 10, and transfers the data items to the liquid crystal display unit 9 for display. A reset terminal R7 is provided with a reset signal when connected to the first voltage detector circuit 4. An output terminal 07 outputs a signal for setting the DCDC converter 2 to ON/OFF, which is connected to the gate of a transistor 8 to be mentioned later.

The transistor 8 is interposed between the control terminal C2 of the DCDC converter 2 and a negative pole. The transistor 8 activates the DCDC converter 2 when a high-level signal is sent to the gate from the microcomputer 7, and stops the DCDC converter 2 when a low-level signal is provided. 9 is a liquid crystal display unit, which displays, for instance, the number of frames of film. The EEPROM 10 is an external memory for transferring data with the microcomputer 7, which stores, for instance, the display data of the liquid crystal display unit 9. 11, 12, 15, and 16 are diodes. 17 is a switch for detecting that a camera is operated. When a release switch or other operating member of a camera is operated, the switch 17 is turned ON to connect the control terminal C2 of the DCDC converter 2 and the terminal I71 of the microcomputer 7 to negative poles.

Figure 2:
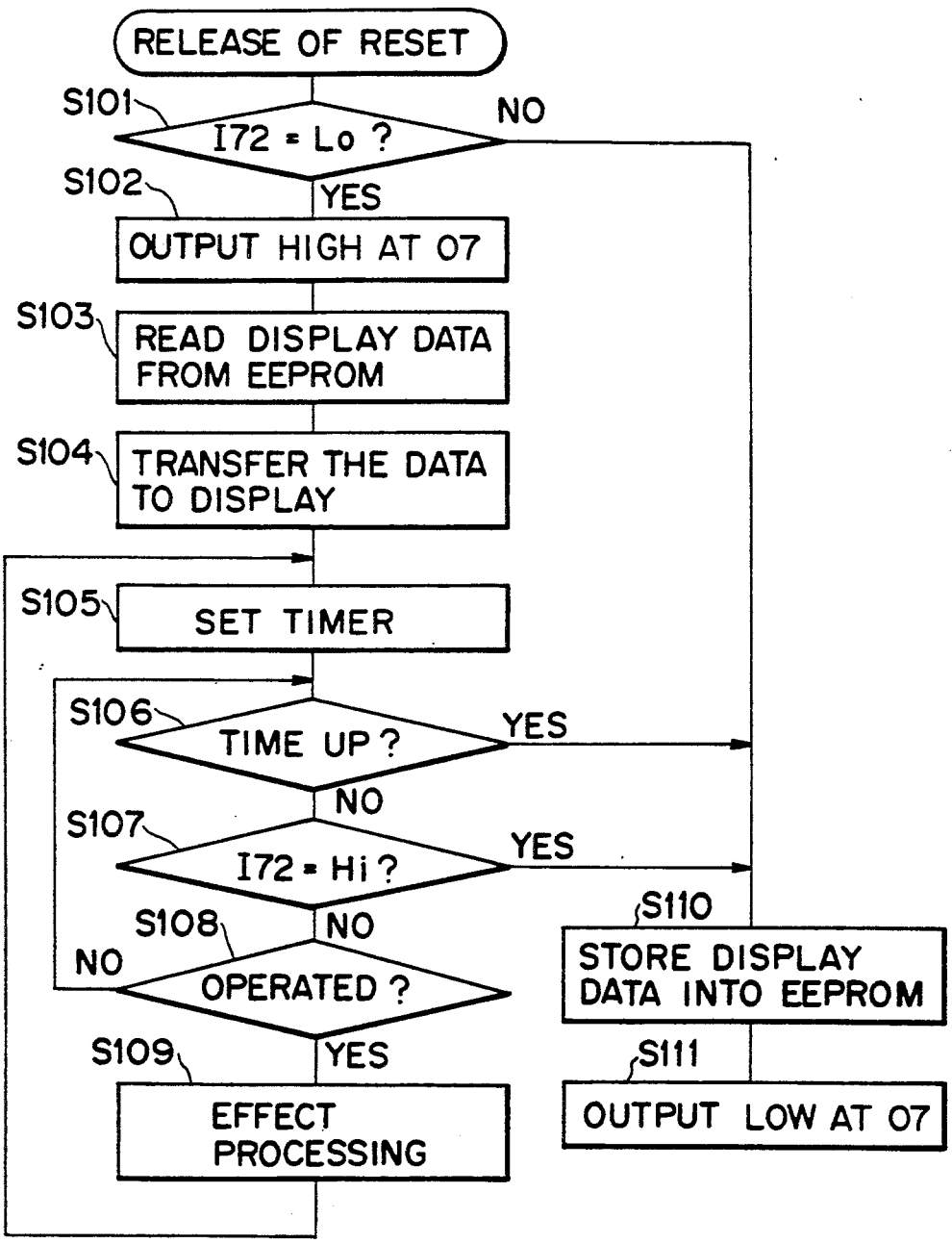
FIG. 2 is a flowchart showing an embodiment of a program contained in a microcomputer employed for the power control circuit.

FIG. 2 is a flowchart showing an embodiment of a power control program contained in a microcomputer 7. Using FIG. 2, the operations of the microcomputer 7 are described.

When a reset terminal R7 of the microcomputer 7 is driven high to release Reset, the program starts. First of all, control is passed to a step S101 to check the state of an input terminal I72. If the input terminal I72 is low or a power switch 3 is turned ON, control is passed to a step S102. When the input terminal I72 is high, control is passed to a step S110. At the step 102, an output terminal 07 is driven high. Next, control is passed to a step S103, the display data of a liquid display unit 9 contained in an EEPROM 10 is read. Then, when control is passed to a step S104, the data is transferred to the liquid crystal display unit 9 for display. Next, at a step S105, a timer is set. The timer is provided to implement the Timer OFF function mentioned previously. When the power switch 3 is turned ON, if no operation is performed for a certain time, the timer causes a time-out.

Then, control is passed to a step S106 and it is checked if the timer causes a time-out. If the time-out occurs (no operation is performed for a certain time), control is passed to a step S110. Otherwise, control is passed to a step S107. At the step S107, the state of the input terminal I72 is checked. If the input terminal I72 is high (the power switch 3 is OFF), control is passed to a step S110. Otherwise, control is passed to a step S108. At the step S108, it is checked, for instance, if a release switch is operated. If operated, control is passed to a step S109. If not operated, control is returned to the step S106. If the decision is made in the affirmative at the step S108, the operation is performed at the step S109. When the operation completes at the step S109, control is returned to the step S105.

If it is determined at the step S101 that the input terminal I72 is not low (the power switch 3 is turned OFF), it is determined at the step S106 that the timer counts up, or it is determined at the step S107 that the input terminal I72 is driven high (the power switch 3 is turned OFF), control is passed to a step S110. The display data of the liquid crystal display unit 9 and other data which must be stored even if the power supply is turned OFF are transferred to the EEPROM 10 and stored there. When the operations complete, control is passed to a step S111. Then, the output terminal 07 is driven low, the operation of the DCDC converter 2 is stopped, then the power supply is turned OFF.

The operations of a power control circuit for cameras having the aforesaid configuration are described below.

FIGS. 3A to 3E are timing charts indicating the operations of main devices within the circuit. The operation to be performed when the power switch 3 is turned ON is described using FIG. 3A.

When the power switch 3 is turned ON at a time T10, the voltage of batteries 1 is applied to the voltage detector terminal S5 of the second voltage detector circuit 5, the gate terminal G of the transistor 6, and the liquid crystal display unit 9. At this time, the output terminal 05 of the second voltage detector circuit 5 is driven low. Thereby, the control terminal C2 of the DCDC converter 2 is driven low to activate the DCDC converter. At the same time, the transistor 6 is turned ON and the terminal I72 of the microcomputer 7 is driven low. After the DCDC converter 2 starts up, when the output voltage reaches a given voltage, the first voltage detector circuit 4 operates at a time T11. Then, the output terminal 04 is driven low, and the microcomputer 7 is reset. At a time T12 after a certain time T1, the output terminal 04 of the first voltage detector circuit is driven high again and Reset is released. At this moment, power is supplied from the DCDC converter 2 to the microcomputer 7. Therefore, the microcomputer 7 becomes aware of the Reset release, then starts running a program shown in FIG. 2. Then, at a time T13, the output terminal 07 is driven high and the transistor 8 is set to ON. At a time T14, the output terminal 05 of the second detector circuit 5 goes high again. However, since the transistor 8 is already ON, the control terminal C2 of the DCDC converter 2 is held low and the DCDC converter 2 continues to operate. When the microcomputer 7 acknowledges that the input terminal I72 is driven low, it reads various data items from the EEPROM 10, and transfers the data items to the liquid display unit 9 for display.

Described below in conjunction with FIG. 3B are the operations for automatically turning OFF the power supply to all devices except a display unit when no operation is performed on a camera for a certain time with a power switch 3 ON.

When contacts 3A and 3B of the power switch 3 are ON, if the release switch, for instance, is operated to set the switch 17 ON, the input terminal I71 of the microcomputer 7 goes low. If the input terminal I71 remains high for a certain time, the timer mentioned previously causes a time-out. At a time T21, the output terminal 07 is driven low. As a result, the transistor 8 is set to OFF. The drain is driven high. At this moment, the output terminal 05 of the second voltage detector circuit 5 is high, and the switch 17 is OFF. Therefore, the control terminal C2 of the DCDC converter 2 goes high. Then, the DCDC converter 2 stops operating. The output voltage of the DCDC converter 2 decreases gradually. When the output voltage becomes lower than the threshold of the first voltage detector circuit 4 at a time T22, an output terminal 04 of the first voltage detector circuit 4 outputs a low-level signal. Then, the microcomputer 7 is reset. Even when the output terminal 04 of the first voltage detector circuit 4 is driven high again and Reset is released at a time T23, since the DCDC converter is already OFF and the output voltage is 0 V, the microcomputer 7 will not restart. In this state, the voltage of batteries 1 is applied to the liquid crystal display unit 9 via the power switch 3A and the diode 11. Therefore, the liquid crystal display unit 9 keeps displaying.

Described below are the operations shown in FIG. 3C to be performed when the release switch for instance, is pressed to restart the power control circuit in the state (Timer OFF) shown in FIG. 3B that the power control circuit stops operating with the power switch 3 ON.

At a time T31, when the release switch, for instance, is operated, the switch 17 is turned ON. Then, the control terminal C2 is a DCDC converter 2 is driven low via the power switch 3 already energized and the diode 15. Then, when the DCDC converter 2 is restarted and the output voltage boosts, the first detector circuit 4 operates at a time T32 and an output terminal 04 goes low. Then, the microcomputer 7 is reset. When the output terminal 04 is driven high again at a time T33 after a certain time T1 has elapsed, Reset is released. Then, the microcomputer 7 is activated to start the program. At a time T34, the microcomputer 7 drives the output terminal 07 high and sets the transistor 8 to ON. After that, even if the switch 17 is turned OFF, the control terminal C2 of the DCDC converter 2 is held low and the DCDC converter 2 continues to operate.

Next, the operations for turning OFF the power switch 3 in such a state that the power control circuit is operating are described in conjunction with FIG. 3D.

When the power switch 3 is turned OFF at a time T41, the transistor 6 is set to OFF and the drain is driven high. The microcomputer 7 uses the input terminal I72 to detect the operation, and transfers display data of the liquid crystal display unit 9 to an EEPROM 10 for storage. After that, the microcomputer 7 drives the output terminal 07 low at a time T43. Then, the transistor 8 is set to OFF. As a result, the drain of the transistor 8 is driven high at a time T43. In the meantime, the output terminal 05 of the second detector circuit 5 is driven low at a time T42 after the power switch 3 is turned OFF. Therefore, the DCDC converter 2 continues to operate. At a time T44, the output terminal 05 of the second detector circuit 5 is driven high. Then, the control terminal C2 of the DCDC converter 2 goes high and the DCDC converter 2 stops operating. When the DCDC converter stops operating, the output voltage declines gradually. At a time T45, the first voltage detector circuit 4 detects the voltage drop. Then, the output terminal 04 is driven low and the microcomputer 7 is reset. At a time T46, the output terminal 04 of the first voltage detector circuit 4 is driven high again and Reset is released. However, since the output of the DCDC converter 2 has already dropped, the microcomputer 7 will not start the operations.

Next, the operations for turning OFF a power switch 3 in such a state that the power supply to all circuits except a display unit is turned OFF by the aforesaid Timer OFF function are described in conjunction with FIG. 3E.

In this state, the DCDC converter 2 stops. When the power switch 3 is turned OFF at a time T51, the output terminal 05 of the second voltage detector circuit 5 is driven low, then the control terminal C2 of the DCDC converter 2 is driven low to activate the DCDC converter. The output voltage of the DCDC converter 2 rises gradually. At a time T52, the output terminal 04 of the first voltage detector circuit 4 is driven low. Then, the microcomputer 7 is reset. At a time T53 after T1 hours, the output terminal 04 of the first voltage detector circuit 4 is driven high again and the microcomputer 7 is activated. Then, the operations are started according to the procedure of a program shown in FIG. 2. However, since the power switch 3 is already OFF, the drain of the transistor 6 is high and the input terminal I72 of the microcomputer 7 is also high. Thereof, the microcomputer 7 transfers display data of the liquid crystal display unit 9 to the EEPROM 10 for storage. After that, when the microcomputer 7 drives the output terminal 07 low at a time T54, the drain of the transistor 8 goes high. At a time T55, the output terminal 05 of the second voltage detector circuit is driven high again. Then, the control terminal C2 of the DCDC converter 2 goes high and the DCDC converter 2 stops operating. When the output voltage of the DCDC converter 2 drops to a given voltage, the first voltage detector circuit 4 operates at a time T56. Then, the output terminal 04 is driven low and the microcomputer 7 is reset. At a time T57, the output terminal 04 of the first voltage detector circuit 4 is driven high. However, since the output voltage of the DCDC converter has already dropped, the microcomputer 7 will not restart.

As described so far, if no operation is performed with the power switch 3 ON, power is supplied onto the liquid crystal display unit 9, and the power supply to other circuits are automatically turned OFF. In this state, when the release switch, for instance, is operated, the DCDC converter 2 is reactivated and power is supplied to all circuits. When the power switch is turned OFF, display data is stored in an EEPROM 10 and the power supply to all circuits including the liquid display unit 9 is turned OFF. Next, when the power switch 3 is turned ON, the display data contained in the EEPROM 10 is read by the microcomputer 7 and transferred to the liquid crystal display unit 9 for display. Thus, unnecessary consumption of batteries 1 is prevented.

This kind of the power control circuit is applicable to any equipment which uses batteries and has a liquid display unit controlled by a microcomputer. Despite a simple configuration, low-power consumption equipment can be provided.

In the aforesaid configuration of an embodiment, the DCDC converter 2 serves as a voltage conversion means, and the contacts 3A, and 3B of the power switch 3, the first and second contacts. Then, the second voltage detector circuit 5 acts as the first activating means, and the transistor 6, as a detecting means, and the microcomputer 7 and the transistor 8, the first and second microcomputer stop means. Then, the microcomputer 7 serves as a transfer means, and an EEPROM 10, as a memory, and the switch 17, as an operating switch.

As described previously, according to the invention, when the power supply to a microcomputer is turned OFF by a Timer OFF function, an operating member is operated to restart the power supply to the microcomputer. When a power switch is turned OFF, the contents of the display on a display unit are transferred to and saved in a memory. After that, the power supply to the microcomputer is turned OFF. The memory need not be supplied power from batteries. This minimizes battery consumption without degrading the conventional display functions.

I claim:
1. A camera comprising:
voltage conversion means provided with a control terminal for controlling start and stop of an operation to convert voltage applied by a battery in accordance with the input level of said control terminal;
power switch means having an open state and a close state;
activation means responsive to said close state of said power switch means for activating said voltage conversion means;
memory means for retaining a content thereof even if power is not supplied from the battery;
operation switch means, said voltage conversion means starting the operation for converting voltage;
display means;
detecting means for detecting said open state of said power switch and producing a detection signal;
control means having a microcomputer which is energized by said voltage conversion means, said control means defining the input level of said control terminal to stop the power supply to said microcomputer provided by said voltage conversion means when said operation switch means is not operated for a certain time with said close state of said power switch means, transferring display data of said display means to said memory means in response to said detection signal, and defining the input level of said control terminal to stop the power supply to said microcomputer provided by said voltage conversion means after the transferring operation.

2. A camera according to claim 1, wherein said control means counts a predetermined time in response to said close state of said power switching means and thereafter stops the power supply to said microcomputer provided by said voltage conversion means.

3. A camera according to claim 1, wherein said power switch means has a first contact which opens or close the power line of the battery and a second contact which is interlocked with said first contact to open and close a circuit between said control terminal and a negative or positive pole.

4. A camera according to claim 3, wherein said detecting means detects the open and close of said first contact and thereafter produces said detection signal.

5. A camera according to claim 4, wherein said activation means activates said voltage conversion means in response to the close of said first contact.

6. A camera according to claim 5, wherein said operation switch means is interposed between said second contact and a negative or positive pole.

* * * * *